No. 803,841. PATENTED NOV. 7, 1905.
W. B. MORGEY.
FIFTH WHEEL.
APPLICATION FILED MAR. 2, 1905.

2 SHEETS—SHEET 1.

Witnesses:
M. M. Hamilton
I. B. Wood

Inventor:-
William B. Morgey
by Harding & Harding
Attorneys.

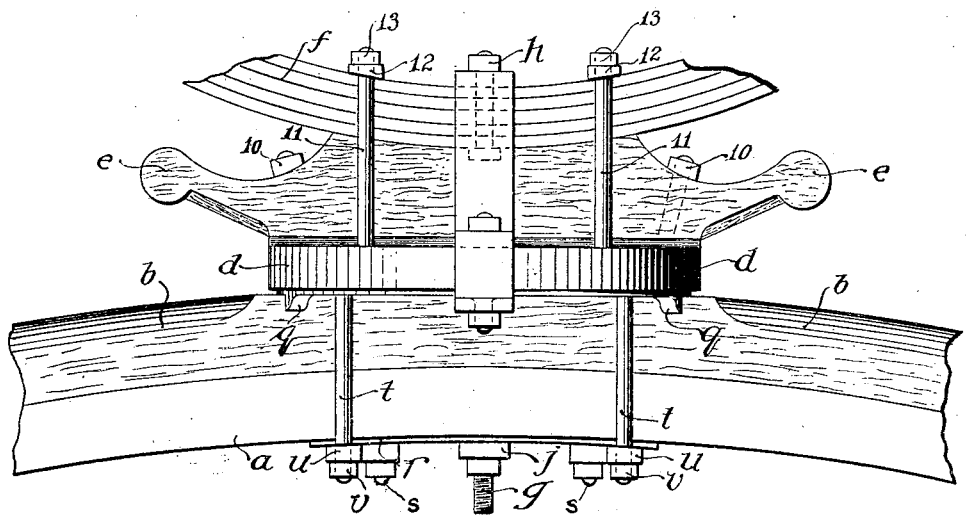
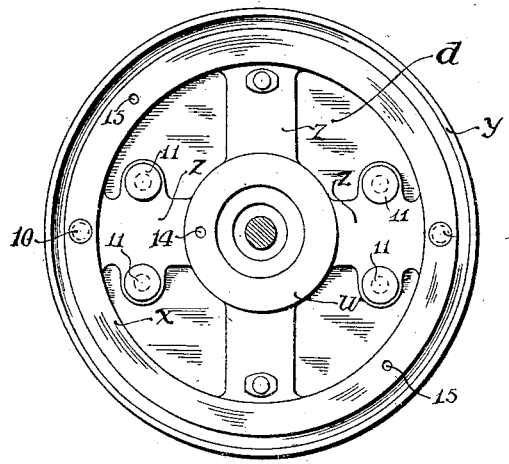
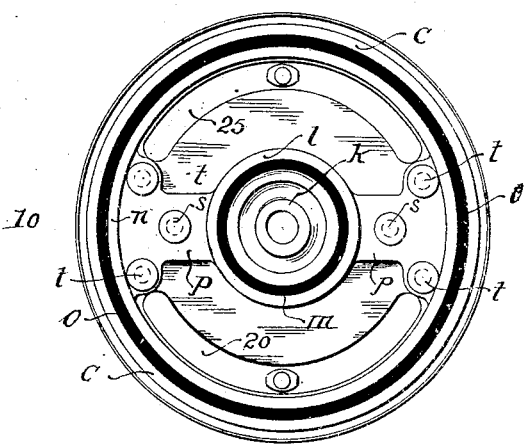

UNITED STATES PATENT OFFICE.

WILLIAM B. MORGEY, OF PHILADELPHIA, PENNSYLVANIA.

FIFTH-WHEEL.

No. 803,841.  Specification of Letters Patent.  Patented Nov. 7, 1905.

Application filed March 2, 1905. Serial No. 248,039.

*To all whom it may concern:*

Be it known that I, WILLIAM B. MORGEY, a citizen of the United States, residing at Philadelphia, county of Philadelphia, and State of Pennsylvania, have invented a new and useful Improvement in Fifth-Wheels, of which the following is a full, clear, and exact description, reference being had to the accompanying drawings, which form a part of this specification.

My invention relates to that part of the gearing of a wheeled vehicle which comprises the fifth-wheel and associated parts for securing the vehicle-body to the front axle.

The objects of the invention are to provide a new construction of fifth-wheel that shall possess more strength and be cheaper to construct than the ordinary fifth-wheel, to afford improved bearings for the fifth-wheel and improved means for lubricating the same, and to provide means for supporting the fifth-wheel independent of the king-bolt.

The invention consists of the general and specific features of construction hereinafter described, and particularly pointed out in the claims.

The invention is applicable to all varieties of wagons, carriages, buggies, and other horse-drawn vehicles, especially those of perch construction, and is capable of application and adaptation to motor-propelled vehicles, such as automobiles and electric-railway cars.

Figure 1:
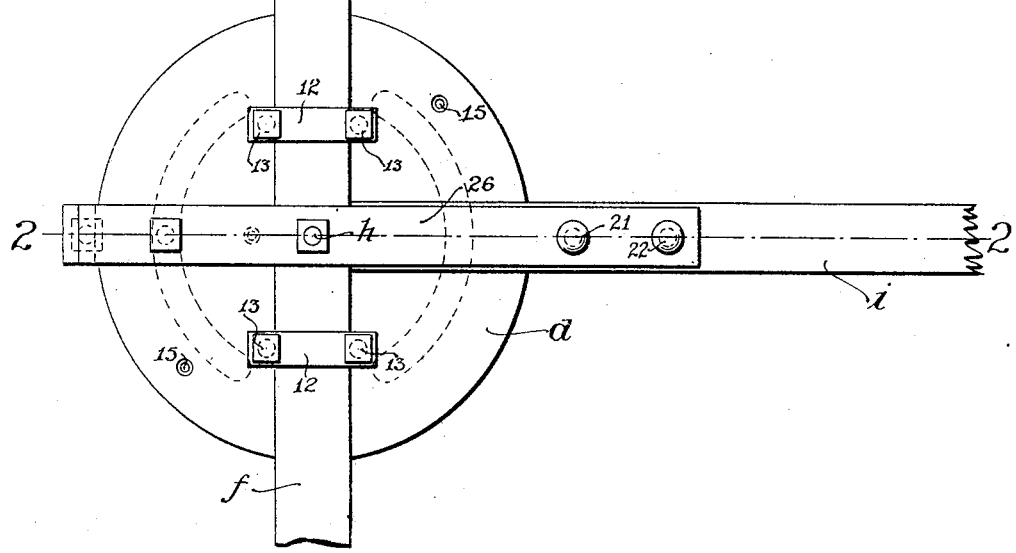
Figure 2:
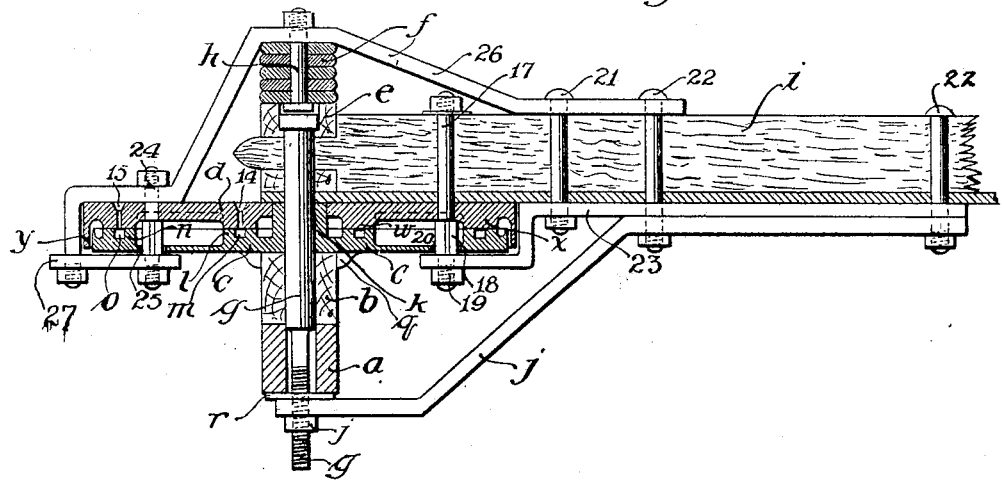

In the drawings, Figure 1 is a plan view of my invention. Fig. 2 is a sectional side elevation on line 2. Fig. 3 is a front elevation. Fig. 4 is a plan of the upper or stationary member of the fifth-wheel. Fig. 5 is a plan of the lower or turnable member of the fifth-wheel.

$a$ is the front axle, $b$ the front axle-bed, $c$ the lower or turnable member of the fifth-wheel secured to the axle, $d$ the upper or stationary member of the fifth-wheel secured to the vehicle-body, $e$ the head-block, $f$ the semi-elliptical spring, $g$ the king-bolt, $h$ the bolt for securing together the spring-sections, $i$ the perch, and $j$ the stay or brace connecting the king-bolt and the perch. The head-block, spring, and perch are the only parts of the wagon-body which it is necessary to illustrate to enable my invention to be fully understood.

The king-bolt $g$ as usual extends through the head-block and thence down through central orifices in both members of the fifth-wheel and through the axle-bed and axle and projects beneath the axle.

The fifth-wheel is of peculiar and novel construction. The lower member $c$ is provided with a central hollow boss $k$, through which the king-bolt extends.

$l$ is an annular ridge on the top surface of the member $c$, surrounding the boss $k$ and separated slightly therefrom.

$m$ is an annular groove formed in the ridge $l$.

$n$ is an annular ridge formed on the top surface of the member $c$ adjacent to its periphery.

$o$ is an annular groove formed in the ridge $n$.

$p\ p$ represent ribs or thickened portions of the member $c$, connecting the ridges $l$ and $n$, but of less thickness than the ridges.

$q$ represents lips projecting below the member $c$ and engaging either side of the axle-bed, the latter, in fact, being confined between the lips.

$r$ is a reinforcing-plate on the bottom of the axle.

$s\ s$ are bolts extending through the ribbed portions of the member $c$, the axle-bed, axle, and reinforcing-plate $r$, thereby securing the member $c$ to the axle. To secure the member $c$ to the axle with still greater security, the bolts $t$ are provided, which bolts extend through the ribbed portions of the member $c$ and engage either side of the axle and axle-bed, so as to confine the axle and axle-bed between the bolts.

$u$ is a tie-bar connecting the lower ends of each pair of bolts $t$ and underlying the reinforcing-plate $r$ and held in place by means of the nuts $v$.

The upper member $d$ of the fifth-wheel is provided on its lower face with the annular ridges $w$ and $x$, overlying and bearing against the ridges $l$ and $n$, respectively, of the member $c$.

$y$ is a depending peripheral flange embracing the lower member $c$.

$z\ z$ are ribs or thickened portions connecting the ridges $w$ and $x$, but of less thickness than the ridges.

The central orifice of the member $d$, through which the king-bolt extends, is made of sufficient diameter to receive the hollow boss $k$ of the member $c$.

10 10 are bolts extending through the head-block $e$ and the ribbed portions of the member $d$, thereby securing the same together.

11 represents bolts extending through the ribbed portions of the member d and engaging either side of the head-block e and spring f, so as to confine the head-block and spring between the bolts.

12 is a tie-bar connecting the upper ends of each pair of bolts 11 and overlying the spring f and held in place by means of the nuts 13.

14 15 15 are orifices formed in the ridged portions of the member d of the fifth-wheel. The orifice 14 is formed in alinement with the groove m, and the orifices 15 15 are found in alinement with the groove o. By means of these holes lubricating material may be introduced into the grooves m and o.

The front end of the perch i projects through and tightly fits within the head-block e and directly overlies and is secured to the top member d of the fifth-wheel by means of the guard-bolt 17. This latter bolt extends through the perch and the ribbed or thickened portion 16 of the member d and depends beneath the lower surface of the member d. This depending end is of peculiar construction, being provided with a shouldered portion 18 adjacent to the member d and a threaded contracted lower end 19. The shouldered portion 18 extends through a slot 20, formed in the member c. This slot is in the shape of an arc of a circle with the king-bolt as its center and lies just within the ridged portion n of the member c. The shouldered portion 18 of the bolt 17 acts as a stop when the rotary member d of the fifth-wheel turns on its axis a distance sufficient to cause the bolt to abut against the end wall of the slot 20.

21 22 22 are bolts extending through the perch back of the fifth-wheel and depending beneath the perch.

23 is the perch-plate for auxiliary fifth-wheel support having bolt-holes alining with the bolts 21 22 22 and the contracted lower end 19 of bolt 17.

The stay or brace j is provided with bolt-holes alining with the bolts 22 22 and the king-bolt g. The necessary nuts are provided to fasten in position the angle-plate 23 and stay j.

It is well recognized that the king-bolt in the ordinary construction being the supporting-center has to stand the entire pulling strain and is subjected to great wear on a short bearing through the transom-plate. This strain on the king-bolt is minimized by my improved construction of fifth-wheel, in which the top and bottom of the fifth-wheel are interlocked together by the center bearing k and peripheral flange y. Moreover, the bolt 17 and auxiliary supporting-plate 23 provide an additional means for securing the parts together, so that even should the king-bolt break the fifth-wheel would still be effectually supported and the parts remain secured together. The collection of dust and dirt in the bearing of the ordinary fifth-wheel and the easy escape of the lubricant applied thereto are also objections which my invention wholly overcomes, as the bearings between the upper and lower members of my improved fifth-wheel are effectively protected from dirt and dust, and the construction of the bearings insures the retention of the lubricant.

As an additional means of supporting the fifth-wheel I may provide the bolt 24, located diametrically opposite to the bolt 17 and similar in construction thereto. A curved slot 25 may be formed in the member c diametrically opposite and similar to the curved slot 20. An angle-bar 26 is secured to the top of the perch, extends up over the spring g, being bolted thereto by means of the bolt h, thence down to, around, and beneath the fifth-wheel and engaging the bolt 24. It will ordinarily be necessary, however, to make the underlying end 27 of the bar 26 separate from the remainder of the bar 26 and secure it to the downwardly-extending portion of bar 26, as shown. It is not necessary, however, that both the auxiliary supports 23 and 26 should be employed, as either of them alone suffices to attain the object of providing a support for the fifth-wheel independent of the king-bolt. Indeed, the king-bolt may be altogether dispensed with, although there are few, if any, situations which would make it advantageous to do so. Apart, however, from the auxiliary supports the fifth-wheel itself possesses advantages heretofore enumerated, and my invention may be embodied in a construction which altogether dispenses with these auxiliary supports. On the other hand, my invention would be embodied in a construction in which these auxiliary supports are applied to a fifth-wheel of quite different specific construction.

Having now fully described my invention, what I claim, and desire to protect by Letters Patent, is—

1. A fifth-wheel for vehicles comprising upper and lower members, one or both of which is provided with annular flat-faced ridges, one of said ridges located near the center of the fifth-wheel and the other of said ridges located near the periphery of the fifth-wheel, there being a groove formed in one of the opposing bearing-faces of each of said bearings, thereby forming two bearings having opposing bearing-surfaces that are flat except for the provision of said grooves, which form a permanently open space for the reception of a lubricant.

2. In a wagon-gear, in combination, the perch, the fifth-wheel comprising upper and lower members and located beneath the perch, the perch-plate secured to the perch and underlying the fifth-wheel, and a bolt extending through the fifth-wheel near its periphery and secured at one end to the perch and at the other end to the perch-plate.

3. In a wagon-gear, in combination, the perch, the fifth-wheel underlying the perch, the perch-plate secured to the perch throughout a part of its length, the inner end of the perch-plate extending downwardly along the periphery of the fifth-wheel and horizontally beneath the fifth-wheel, and a bolt extending through the fifth-wheel and secured at one end to the perch and at the other end to the perch-plate.

4. In a wagon-gear, in combination, the perch, the fifth-wheel underlying the perch and having an upper and lower member the latter being cut away, a bolt secured to the perch at its upper end and extending through the upper member and the cut-away portion of the lower member, the part of the bolt extending through the cut-away part of the lower member being shouldered, and a perch-plate secured to the perch and extending downwardly along the periphery of the fifth-wheel and horizontally beneath the fifth-wheel and secured to the bolt, the shouldered portion of the bolt resting on said perch-plate.

5. In a wagon-gear, in combination, a fifth-wheel comprising upper and lower members having opposing bearing-surfaces near their peripheries, the perch, a bolt extending through both members of the fifth-wheel and secured at one end to the perch, and a perch-plate secured to the perch and to which the other end of said bolt is secured, one of said fifth-wheel members being cut away inside and parallel with its bearing-surface, said bolt extending through such cut-away portion.

6. In a wagon-gear, in combination, the axle, the perch, the king-bolt, the fifth-wheel comprising upper and lower members having two pairs of opposing bearing-surfaces located respectively near the king-bolt and near the periphery of the fifth-wheel, one of said members being cut away inside and parallel with its outer bearing-surface, a bolt extending through said cut-away portion and also through the other member and supported at both ends from the perch.

7. In a wagon-gear, in combination, the axle, the perch, the king-bolt, the fifth-wheel comprising upper and lower members having two pairs of opposing bearing-surfaces located respectively near the king-bolt and near the periphery of the fifth-wheel, one of said members being cut away inside and parallel with its outer bearing-surface, a bolt extending through said cut-away portion and also through the other member and supported at both ends from the perch, and a stay secured to the perch and extending under the axle and secured to the king-bolt.

8. In a wagon-gear, in combination, the axle, the perch, the fifth-wheel comprising upper and lower members, the king-bolt extending through the centers of said members, one of said members having two annular grooves of relatively large and small diameters respectively and located respectively, on its opposing face, close to the king-bolt and close to the periphery of the fifth-wheel respectively, a bolt extending through both of said members, one of which is cut away between said grooves to receive the bolt and permit the member to turn, a perch-plate secured to the perch, said bolt being secured at one end to the perch and at the other end to the supporting-bar, and a stay secured to the perch and extending under the axle and secured to the king-bolt.

In testimony of which invention I have hereunto set my hand, at Philadelphia, on this 24th day of February, 1905.

WILLIAM B. MORGEY.

Witnesses:
M. M. HAMILTON,
THORNLEY B. WOOD.